United States Patent Office 2,810,711
Patented Oct. 22, 1957

2,810,711

POLYMERIC ISOCYANATES AND THEIR PRODUCTION

Hans Holtschmidt, Koln-Stammheim, Germany, assignor to Farbenfabriken Bayer Aktiengesellschaft, Leverkusen, Germany, a corporation of Germany No Drawing. Application May 19, 1954,
Serial No. 430,975

Claims priority, application Germany May 23, 1953

7 Claims. (Cl. 260—77.5)

This invention relates to a process for the production of polymeric isocyanates and to the polymeric isocyanates thus produced.

It is known to convert compounds of the benzyl halide type, of the general formula

R.CH$_2$.X wherein R is an aromatic radical which may carry substituents such as NO$_2$, Cl or CN and X is a halogen atom, into high molecular weight resinous substances (see Zinke, Berichte 2,739 and German Patent No. 280,595), by treatment with metal halides, such as FeCl$_3$ and SnCl$_4$ (in the cold), or AlCl$_3$ and ZnCl$_2$ (with heating). The reaction in which the halogen is split off from the side chain in the form of hydrogen halide proceeds practically quantitatively and leads to the formation of polyhydrocarbons.

The products thus obtained are soluble in the solvents employed in the manufacture of lacquers, e. g. chloroform, carbon tetrachloride, methylene chloride and cyclohexanone, and are highly suitable starting materials for the manufacture of lacquers and varnishes (see German Patent No. 280,377).

In accordance with this invention it has now been found that the aforesaid polycondensation in the presence of a Friedel-Crafts catalyst can likewise be carried out on halogeno-alkyl aryl isocyanates.

The halogeno-alkyl aryl isocyanates used as starting material for the process of the invention can be prepared in a simple manner according to the process described in my co-pending application Ser. No. 421,976, filed April 8, 1954, by treating alkaryl isocyanates with a halogen under conditions suitable for side-chain halogenation.

As in the known polycondensation reaction, the reaction can be initiated by means of extremely small quantities of the catalyst (0.5%). If the reaction is carried out in the presence of FeCl$_3$, the reaction starts without heating and proceeds at a very high velocity. During the reaction the temperature rises by 60–80° C. within 10 minutes; therefore, the reaction has to be carried out with cooling if large quantities of the components are used in order to avoid overheating.

It has often proved advantageous to convert the NCO-groups, wholly or in part, into the corresponding carbamic acid halides prior to the addition of the catalyst; the polycondensation then proceeds at a higher velocity and yields products of higher molecular weight. By heating the reaction product to 80–120° C. towards the end of the reaction the carbamic acid halides can be reconverted into the isocyanates, hydrogen halide also being formed.

The process of the present invention allows the production of co-condensates with benzyl halides containing no isocyanate groups, for instance benzyl chloride or chloromethyl naphthalene. Moreover, the polycondensation may be carried out in the presence of suitable solvents, such as methylene chloride, chloroform or trichloroethylene. The addition of 1 to 50% of methylene chloride has been found to be particularly useful for carrying out the polycondensation.

The new polymeric isocyanates obtained according to the invention are viscous oils or hard resins which have an estimated molecular weight of between 800 and 2000, corresponding to 8 to 25 NCO-groups per molecule. Depending upon the catalyst employed, the products are brown or dark red colored.

The new isocyanates have practically no vapor pressure, since they are polymeric compounds, and can therefore be used without causing physiologically harmful effects. This property of the new isocyanates is especially advantageous in the plastic industry, particularly in the manufacture of adhesives. The new isocyanates can be reacted with diols and polyesters in known manner.

Any monomeric isocyanate which is still present after the polycondensation reaction can be removed by heating the polymeric product for a short time in vacuo, or by washing with gasoline or petroleum ether, in which solvents the monomeric isocyanate is easily soluble and the polymeric isocyanate insoluble.

The invention is further illustrated by the following examples without being restricted thereto.

*Example 1*

1 gram of finely pulverized sublimed FeCl$_3$ is introduced at room temperature with vigorous stirring into 208.5 grams (1 mol) of 1-chloromethyl-2,4-phenylene-diisocyanate. The temperature rises from 20° to 85° C. within 10 minutes and large quantities of HCl are formed with vigorous foaming.

The viscosity of the mixture increases rapidly. After the reaction has subsided the temperature is brought to 90–100° C. by heating, and the hydrochloric acid is completely removed by passing in nitrogen in a vigorous stream.

The reaction product is a light-red colored, very viscous resin which dissolves in chlorinated hydrocarbons and the solvents customarily employed for lacquers. The product reacts with diols and linear polyesters immediately with the formation of entirely cross-linked polyurethanes.

*Example 2*

Hydrochloric acid is introduced into 208.5 grams (1 mol) of an isomeric mixture of 1,2,4- and 1,2,6-chloromethylphenylene-diisocyanate at room temperature until the temperature, which first rises to 70° C., falls again. After the addition of 1 gram of ferric chloride the reaction starts, the reaction mixture becoming red colored and HCl being evolved. The reaction is completed as described in Example 1. The reaction product is a viscous resin which is brittle when cold.

*Example 3*

If 167.5 grams of p-chloromethyl-phenylisocyanate are mixed with 0.5% of FeCl$_3$ as described in Example 1, a very vigorous reaction occurs. The temperature rises to 80° C. within some minutes with brisk formation of HCl. The reaction is completed as described in Example 1. The product obtained is a viscous resin.

*Example 4*

Equal parts of benzyl chloride and 1,2,4-chloromethyl-phenylene-diisocyanate are reacted with 0.5% of FeCl$_3$ and the reaction is completed as described in Example 1. The properties of the dark-brown colored resin thus obtained are similar to those of the product of Example 1.

*Example 5*

300 grams of an isomeric mixture of chloromethyl-phenylene-diisocyanate as used in Example 2 are dissolved in 150 grams of methylene chloride and reacted with 2.5 grams of FeCl₃. A vigorous reaction occurs, HCl is formed, and the rapid increase in temperature causes the methylene chloride to boil vigorously.

The carbamic acid chloride formed can be decomposed by distilling off the methylene chloride and bringing the temperature to about 100° C. The reaction is completed as described in Example 1.

*Example 6*

A stream of hydrogen chloride gas is passed with stirring at a temperature of 50–60° C. into 208.5 grams (1 mol) of 1-chloromethyl-phenylene-diisocyanate until the mixture is saturated. The resulting reaction product has a pulpy consistency; about 50% of the NCO-groups have reacted with hydrogen chloride to form carbamic acid chloride groups. 1 gram of FeCl₃ is added with vigorous stirring and upon completion of the reaction the mixture is worked up as described in Example 1. The polymerization requires only about 5 minutes.

I claim:

1. A process for the production of polymeric isocyanates, which comprises contacting a halogenoalkyl aryl isocyanate of the general formula

R.CH₂.X wherein R is an aromatic radical containing at least 1 and not more than 2 isocyanate groups and X is a halogen atom and said CH₂X group is attached to the aromatic ring, with a Friedel-Crafts catalyst.

2. A process for the production of polymeric isocyanates, which comprises introducing gaseous hydrogen halide into a halogeno-alkyl aryl isocyanate of the general formula

R.CH₂.X wherein R is an aromatic radical containing at least 1 and not more than 2 isocyanate groups and X is a halogen atom and said CH₂X group is attached to the aromatic ring, until the temperature which first rises falls again, adding a Friedel-Crafts catalyst and heating when the temperature falls.

3. A process for the production of polymeric isocyanates, which comprises contacting a halogenoalkyl aryl isocyanate of the general formula

R.CH₂.X wherein R is an aromatic radical containing at least 1 and not more than 2 isocyanate groups and X is a halogen atom and said CH₂X group is attached to the aromatic ring, with a Friedel-Crafts catalyst, heating the mixture to a temperature above the decomposition point of the carbamic acid halide thus formed, and completely removing the hydrogen halide from the reaction mixture by introducing an inert gas.

4. A process for the production of polymeric isocyanates which comprises contacting a mixture containing a halogeno-alkyl isocyanate of the general formula

R.CH₂.X wherein R is an aromatic radical containing at least 1 and not more than 2 isocyanate groups and X is a halogen atom and said CH₂X group is attached to the aromatic ring, and a compound of said formula wherein the aromatic radical R contains no NCO-group, with a Friedel-Crafts catalyst.

5. A process for the production of polymeric isocyanates, which comprises contacting a halogenoalkyl aryl isocyanate of the general formula

R.CH₂.X wherein R is an aromatic radical containing at least 1 and not more than 2 isocyanate groups and X is a halogen atom and said CH₂X group is attached to the aromatic ring, with a Friedel-Crafts catalyst in the presence of an organic solvent.

6. A polymeric isocyanate obtained by contacting a halogeno-alkyl aryl isocyanate of the general formula

R.CH₂.X wherein R is an aromatic radical containing at least 1 and not more than 2 isocyanate groups and X is a halogen atom and said CH₂X group is attached to the aromatic ring, with a Friedel-Crafts catalyst.

7. A polymeric isocyanate obtained by contacting a mixture containing a halogeno-alkyl isocyanate of the general formula

R.CH₂.X wherein R is an aromatic radical containing at least 1 and not more than 2 isocyanate groups and X is a halogen atom and said CH₂X group is attached to the aromatic ring, and a compound of said formula wherein the aromatic radical R contains no NCO-group, with a Friedel-Crafts catalyst.

References Cited in the file of this patent

FOREIGN PATENTS 405,523    Italy _____ Aug. 18, 1943